(12) United States Patent
Kopetz (10) Patent No.: US 11,662,764 B2
(45) Date of Patent: May 30, 2023

(54) METHOD FOR CONTROLLING AND AUTOMATICALLY RESTARTING A TECHNICAL APPARATUS

(71) Applicant: TTTech Auto AG, Vienna (AT)

(72) Inventor: Hermann Kopetz, Krumpendorf (AT)

(73) Assignee: TTTech Auto AG, Vienna (AT)

(*) Notice: Subject to any disclaimer, the term of this patent is extended or adjusted under 35 U.S.C. 154(b) by 21 days.

(21) Appl. No.: 17/540,564

(22) Filed: Dec. 2, 2021

(65) Prior Publication Data
US 2022/0236762 A1 Jul. 28, 2022

(30) Foreign Application Priority Data
Jan. 26, 2021 (EP) .................................. 21153401

(51) Int. Cl.
*G06F 1/12* (2006.01)
*G06F 1/24* (2006.01)
*G06F 9/445* (2018.01)

(52) U.S. Cl.
CPC .................. *G06F 1/12* (2013.01); *G06F 1/24* (2013.01); *G06F 9/445* (2013.01)

(58) Field of Classification Search
CPC .............. G06F 1/12; G06F 1/24; G06F 9/445
See application file for complete search history.

(56) References Cited

U.S. PATENT DOCUMENTS

2017/0161116 A1 6/2017 Kopetz et al.
2018/0267550 A1 9/2018 Kopetz et al.

FOREIGN PATENT DOCUMENTS

EP 3557356 A1 10/2019

OTHER PUBLICATIONS

European Search Report of European Patent Application No. EP 21153401.1 dated Jul. 2, 2021.

*Primary Examiner* — Zahid Choudhury
(74) *Attorney, Agent, or Firm* — Eversheds Sutherland (US) LLP (57) ABSTRACT

The invention is part of the field of computer technology. It describes the architecture of a secure automation system and a method for safe autonomous operation of a technical apparatus, in particular a motor vehicle. The architecture disclosed herein solves the problem that any Byzantine error in one of the complex subsystems of a distributed real-time computer system, regardless of whether the error was triggered by a random hardware failure, a design error in the software or an intrusion, must be recognized and controlled in such a way that no security-relevant incident occurs. The architecture includes four largely independent subsystems which are arranged hierarchically and each form an isolated Fault-Containment Unit (FCU). At the top of the hierarchy is a secure subsystem, which executes simple software on fault-tolerant hardware. The other three subsystems are insecure because they contain complex software executed on non-fault-tolerant hardware.

18 Claims, 3 Drawing Sheets

METHOD FOR CONTROLLING AND AUTOMATICALLY RESTARTING A TECHNICAL APPARATUS

CROSS-REFERENCE TO RELATED APPLICATIONS

This applications claims priority to and the benefit of European patent application No. 21153401.1, filed Jan. 26, 2021, which is hereby incorporated by referenced herein in its entirety.

FIELD

The invention relates to a method for controlling and automatically restarting a technical apparatus, e.g. a technical system, such as a robot or a vehicle, in particular a motor vehicle, with a distributed real-time computer system, wherein the real-time computer system comprises subsystems, in particular a plurality of subsystems, wherein, for example, the subsystems are hierarchically arranged, and wherein the subsystems are synchronized via a global time, for example by the presence of a time server which is preferably positioned outside the hierarchy of subsystems, wherein the time server periodically sends synchronization messages to each subsystem, such as to the clocks of each subsystem, for synchronizing the subsystems or the clocks of the subsystems to establish the global time, and wherein, using said global time, the timeline is divided into a sequence of synchronized time slices.

Furthermore, the invention relates to a real-time computer system, in particular a distributed real-time computer system, for controlling a technical apparatus, e.g. a technical system, such as a robot or a vehicle, in particular a motor vehicle, wherein the real-time computer system comprises subsystems, in particular a plurality of subsystems, wherein, for example, the subsystems are hierarchically arranged, and wherein the subsystems are synchronized via a global time, for example by the presence of a time server which is preferably positioned outside the hierarchy of subsystems, wherein the time server is set up to periodically send synchronization messages to each subsystem, such as to the clocks of each subsystem, for synchronizing the subsystems or the clocks of the subsystems to establish the global time, and wherein, using said global time, the timeline is divided into a sequence of synchronized time slices.

The invention is part of the field of computer technology. It describes a method for safe autonomous operation and restarting after the occurrence of a transient error in a technical apparatus, such as a robot or a vehicle, in particular a motor vehicle, and a real-time computer system for controlling such a technical apparatus. In the literature, a system consisting of a technical apparatus and a real-time computer system controlling the apparatus is also referred to as a Cyber-Physical System (CPS).

BACKGROUND

The autonomous operation of a technical apparatus, e.g. a technical system, such as a robot or a vehicle, in particular a motor vehicle, requires a real-time computer system which observes the environment of the technical apparatus, for example of the technical system, by means of sensors, evaluates the sensor data by means of a process model executed on the real-time computer system and transfers the calculated setpoints to the actuators, which influence the course of the physical processes. The observing of the environment can be carried out, for example, by means of optical sensors (camera), LIDAR, radar sensors and various other sensors. The evaluation of the sensor data, the data fusion of the sensor data and the creation of necessary environmental models, as well as the planning of the trajectories, require complex software components with millions of commands.

In many Cyber-Physical Systems, e.g., in the autonomous controlling of a vehicle, an error occurring in the real-time computer system can have serious consequences. Such an error can be triggered by a transient or permanent failure of the hardware of a subsystem or by a defect in the software (design error). In safety-critical applications, it is required that the Mean Time To Fail (MTTF) of a catastrophic system-level failure must be on the order of $10^8$ to $10^9$ hours.

However, a malfunction of the system can also be triggered by an Intrusion. In the case of an Intrusion (a break-in into the system), an Intruder bypasses the Intrusion Detection Mechanisms and takes full control of the system. The intruder can then produce a Byzantine error of the compromised subsystem. "In information technology, Byzantine errors are those errors in which a system behaves incorrectly in an arbitrary manner" [WikIb]. A Byzantine error is thus the most malicious error that can occur in a system.

The architecture of a secure real-time computer system must ensure that any and all Byzantine errors in one of the complex subsystems of the real-time computer system, whether caused by a random hardware failure, a design flaw in the software, or an intrusion, are recognized and controlled in such a way that the technical apparatus is put into a safe state. The safe state can be static, i.e., the operation of the technical apparatus is stopped, or dynamic, i.e., the technical apparatus is directed into a safe operating range.

In the following, a distinction is made between a transient and a permanent cause of the error.

A transient cause of the error is present when the cause of the error is temporary and has not led to any persistent damage to computer hardware, in particular the real-time computer system, or the technical apparatus. An example of a transient error is a Single Event Upset (SEU) [Con02] triggered by natural cosmic radiation, which has led to a one-time Bit flip in the memory of a computer but does not further impair the future physical function of the memory.

A permanent cause of the error is present when the cause of the error is consistent and has led to a persistent damage to the computer hardware or the technical apparatus. An example of a permanent error is the breakage of an electrical line.

As the hardware of the technical system and the computer remain functional even after the occurrence of a transient error, it is possible in principle to resume the normal operation of the apparatus as soon as the data structures damaged by the cause of the error have been repaired.

SUMMARY

It is an object of the present invention to disclose a method and a real-time computer system which automatically restores the normal operation of the technical system after the occurrence of a transient error.

This object is achieved by means of the aforementioned method in that, according to the invention, each subsystem and, if present, the time server, forms its own Fault-Containment Unit, and wherein one of the subsystems is a decision subsystem, the so-called Fault-Tolerant Decision Subsystem, FTDSS, which is preferably positioned at the highest level of the hierarchy, wherein the FTDSS is set up to transfer setpoints to actuators in each time slice by means of messages, wherein the Fault-Tolerant Decision Subsystem, FTDSS, is a secure subsystem, i.e., contains simple software executed on fault-tolerant hardware, and wherein at least or exactly three Data Processing Subsystems, a Normal Processing Subsystem, NPSS, a Monitor Subsystem, MSS, and a Critical Event Handling Subsystem, CEHSS, are provided, all of which are preferably positioned at the next lower hierarchical level, wherein these at least or exactly three data processing subsystems are set up to capture sensor data by means of sensors from an environment observed by the sensors and to evaluate these sensor data independently of each other, wherein the environment is observed by the data processing subsystems at the beginning of each time slice and calculations are carried out during this time slice with the sensor data obtained from the observations of the environment carried out at the beginning of said time slice, and wherein i. the Normal Processing Subsystem, NPSS, sends a set of setpoints for a normal operation in a message to the Fault-Tolerant Decision Subsystem, FTDSS, and in a message to the Monitor Subsystem, MSS, during each time slice, preferably at the end of the time slice, and wherein ii. the Critical Event Handling Subsystem, CEHSS, sends a set of setpoints for an abnormal operation in a message to the Fault-Tolerant Decision Subsystem, FTDSS, during each time slice, preferably at the end of said time slice, and wherein the CEHSS also communicates to the FTDSS in said message whether the technical apparatus is in a safe state, and wherein iii. the Fault-Tolerant Decision Subsystem, FTDSS, sends the received set of setpoints for normal operation in a message to the Monitor Subsystem, MSS, during each time slice, preferably at the end of said time slice, and wherein, preferably, the Fault-Tolerant Decision Subsystem, FTDSS, furthermore sends the received set of setpoints for abnormal operation in a message to the Monitor Subsystem, MSS, during each time slice, preferably at the end of said time slice, and wherein iv. the Monitor Subsystem, MSS, carries out a review during each time slice whether the set of setpoints for normal operation which it received from the Normal Processing Subsystem, NPSS, in the message is consistent with an environmental model calculated by the MSS on the basis of the sensor data from the MSS and ensures safe control of the technical apparatus under normal conditions, and furthermore the Monitor Subsystem, MSS, carries out a review during each time slice whether the set of setpoints for normal operation, which it received from the Normal Processing Subsystem, NPSS, in said message, is identical to the corresponding set of setpoints sent by the Normal Processing Subsystem, NPSS, via the Fault-Tolerant Decision Subsystem, FTDSS, to the Monitor Subsystem, MSS, and, if both reviews are positive, sets a correctness indicator, correctness indicator-1, to the value TRUE and, if one of the two checks is negative or both checks are negative, sets the correctness indicator-1 to the value FALSE and sends the correctness indicator-1 or the value of the correctness indicator-1 to the Fault-Tolerant Decision Subsystem, FTDSS, in a message during each time slice, and wherein the Fault-Tolerant Decision Subsystem, FTDSS, makes a decision as follows during each time slice: in the event that the correctness indicator-1 is TRUE, the set of setpoints for normal operation is transferred to the actuators, for example in messages; in the event that the correctness indicator-1 has a value of FALSE or if a message with the correctness indicator-1 expected by the FTDSS is missing, the set of setpoints for abnormal operation is forwarded to the actuators, for example in messages, wherein, in this case, the setpoints for abnormal operation are forwarded to the actuators during the time slices following that point in time until the technical apparatus has reached a safe state, which is communicated to the FTDSS by the CEHSS, preferably in the message, and wherein the Fault-Tolerant Decision Subsystem, FTDSS, sends the setpoints forwarded to the actuators to the NPSS and to the MSS in messages during each time slice, and wherein, in the event that the NPSS and/or MSS, based on the review of the setpoints contained in the messages, determine(s) that the FTDSS has forwarded the setpoints for abnormal operation to the actuators, a restart of the MSS and NPSS is triggered, wherein the restart is completed as soon as the FTDSS, based on the content of the message from the CEHSS, in which the CEHSS communicates whether the technical apparatus is in a safe state, determines that the system is in a safe state, and the FTDSS receives a set of setpoints for normal operation from the NPSS during a time slice, for example in a message, and the FTDSS receives the correctness indicator-1 with a value of TRUE from the MSS, for example with a message, during said time slice, and wherein, after completion of the restart, the FTDSS again transfers the setpoints for normal operation received from the NPSS to the actuators, such that steps i.-iv. can be carried out again or are carried out, and wherein the restart of the two data processing subsystems, namely the NPSS and the MSS, each comprises the following steps:

a) resetting the hardware of the data processing subsystem, b) executing a test software for determining the integrity of the data processing subsystem, c) reinitializing and restarting the software of the data processing subsystem, d) performing calculations with the sensor data obtained from observations of the environment made at the beginning of a time slice.

Furthermore, this object is achieved by means of the aforementioned real-time computer system, wherein according to the invention each subsystem and, if present, the time server, forms its own Fault-Containment Unit, and wherein one of the subsystems is a decision subsystem, the so-called Fault-Tolerant Decision Subsystem, FTDSS, which is preferably positioned at the highest level of the hierarchy, wherein the FTDSS is set up to transfer setpoints to actuators in each time slice by means of messages, wherein the Fault-Tolerant Decision Subsystem, FTDSS, is a secure subsystem, i.e., contains simple software executed on fault-tolerant hardware, and wherein at least or exactly three Data Processing Subsystems, a Normal Processing Subsystem, NPSS, a Monitor Subsystem, MSS, and a Critical Event Handling Subsystem, CEHSS, are provided, all of which are preferably positioned at the next lower hierarchical level, wherein these at least or exactly three data processing subsystems are set up to capture sensor data by means of sensors from an environment observed by the sensors and to evaluate these sensor data independently of each other, wherein the environment is observed by the data processing subsystems at the beginning of each time slice and calculations are carried out during this time slice with the sensor data obtained from the observations of the environment carried out at the beginning of said time slice, i. the Normal Processing Subsystem, NPSS, is set up to send a set of setpoints for normal operation in a message to the Fault-Tolerant Decision Subsystem, FTDSS, and in a message to the Monitor Subsystem, MSS, during each time slice, preferably at the end of the time slice, and wherein ii. the Critical Event Handling Subsystem, CEHSS, is set up to send a set of setpoints for abnormal operation in a message to the Fault-Tolerant Decision Subsystem, FTDSS, during each time slice, preferably at the end of said time slice, and wherein the CEHSS is set up to communicate to the FTDSS, preferably in said message, whether the technical apparatus is in a safe state, and wherein iii. the Fault-Tolerant Decision Subsystem, FTDSS, is set up to send the received set of setpoints for normal operation in a message to the Monitor Subsystem, MSS, during each time slice, and wherein, preferably, the Fault-Tolerant Decision Subsystem, FTDSS, is set up to furthermore send the received set of setpoints for abnormal operation in a message to the Monitor Subsystem, MSS, during each time slice, preferably at the end of said time slice, and wherein iv. the Monitor Subsystem, MSS, is set up to carry out a review during each time slice whether the set of setpoints for normal operation, which it received from the Normal Processing Subsystem, NPSS, in the message, is compatible with an environmental model calculated by the MSS on the basis of the sensor data from the MSS and ensures safe control of the technical apparatus under normal conditions, and furthermore the Monitor Subsystem, MSS, is set up to carry out a review during each time slice whether the set of setpoints for normal operation which it received, or is receiving, from the Normal Processing Subsystem, NPSS, in said message is identical to the corresponding set of setpoints sent by the Normal Processing Subsystem, NPSS, via the Fault-Tolerant Decision Subsystem, FTDSS, to the Monitor Subsystem, MSS, and, if both reviews are positive, to set a correctness indicator, correctness indicator-1, to the value TRUE and, if one of the two checks is negative or both checks are negative, to set the correctness indicator-1 to the value FALSE and to send the correctness indicator-1 or the value of the correctness indicator-1 in a message to the Fault-Tolerant Decision Subsystem, FTDSS, during each time slice, and wherein the Fault-Tolerant Decision Subsystem, FTDSS, makes a decision as follows during each time slice: in the event that the value of the correctness indicator-1 is TRUE, the set of setpoints for normal operation, such as in messages, is transferred to the actuators; in the event that the correctness indicator-1 has a value of FALSE or if a message with the correctness indicator-1 expected by the FTDSS is missing, the set of setpoints for abnormal operation is forwarded to the actuators, for example in messages, wherein, in this case, the setpoints for abnormal operation are forwarded to the actuators during the time slices following that point in time until the technical apparatus reaches a safe state, which is communicated to the FTDSS by the CEHSS, preferably in a message, and wherein the Fault-Tolerant Decision Subsystem, FTDSS, is set up to send the setpoints forwarded to the actuators in messages to the NPSS and to the MSS during each time slice, and wherein, in the event that the NPSS and/or the MSS, on the basis of the review of the setpoints contained in the messages, determine that the FTDSS has forwarded the setpoints for abnormal operation to the actuators, a restart of the MSS and the NPSS is triggered, wherein preferably both the NPSS and the MSS are set up to trigger their own restart, wherein the restart is completed as soon as the FTDSS, based on the content of the message from the CEHSS, in which the CEHSS communicates whether the technical apparatus is in a safe state, determines that the system is in a safe state, and the FTDSS, receives a set of setpoints for normal operation from the NPSS during a time slice, for example, in a message, and the FTDSS receives the correctness indicator-1 with a value of TRUE from the MSS, for example with a message, during said time slice, and wherein, after completion of the restart, the FTDSS again transfers the setpoints for normal operation received from the NPSS to the actuators, such that steps i.-iv. can be carried out again or are carried out, and wherein restarting the two data processing subsystems, namely the NPSS and the MSS, each comprises the following steps:

a) resetting the hardware of the data processing subsystem, b) executing a test software for determining the integrity of the data processing subsystem, c) reinitializing and restarting the software of the data processing subsystem, d) performing calculations with the sensor data obtained from observations of the environment made at the beginning of a time slice.

The ISO standard ISO 26262 on functional safety for the development, testing and certification of software in safety-relevant applications in the automotive industry introduces four ASIL (Automotive Safety Integrity Levels) safety levels: ASIL A (lowest safety level), ASIL B, ASIL C and ASIL D (highest safety level). ASIL D describes a very complex software development process that should result in error-free software. NASA's experiences [Dvo09] have shown that it is practically impossible to eliminate all design errors present in a complex software system, i.e., a system with more than 10,000 commands We therefore refer to a software system or software which comprises fewer than 10,000 commands and has been developed according to ASIL D to eliminate all design errors, as a simple software system/simple software. It is assumed that a simple software system/simple software developed according to ASIL D is free of design errors.

If a software system or a software is not a simple software system or software, we refer to it as a complex software system or as complex software. A complex software system or software can contain unrecognized design errors, e.g., also Byzantine errors such as those triggered by an intrusion.

According to the invention, the real-time computer system disclosed in the same includes at least four largely independent subsystems, preferably arranged hierarchically, the design of which is diversified, such that the subsystems can be largely independent of each other and mutually review each other.

The term "largely independent" is intended to express that full independence would require the exclusion of all influencing factors that could act on the subsystems at the same time, such as temperature, cosmic radiation, which can trigger SEU (single event upsets), delay in the event of an accident, power supply, etc. As the realization of totally independent Subsystems is not technically possible, the term largely independent is introduced.

Two redundant software systems are diversified if the given task is solved by independent development teams, with different development tools using different algorithms. Diversified software minimizes the likelihood that a software error will occur simultaneously in both systems in two redundant software systems [Avi85].

We refer to two redundant subsystems as diversified if at least the software used in the subsystems is diversified. A higher degree of diversity is realized if the hardware used in the respective systems is also different.

Furthermore, a fifth subsystem, a time server, is present in the architecture, which time server is preferably outside the hierarchy and periodically sends time signals to the other subsystems to synchronize the clocks of the subsystems and maintain a global time. Using this global time, the timeline is divided into a sequence of synchronized time slices. Normally, a subsystem observes the environment at the beginning of a time slice, using the existing sensors. The scheduled calculations are performed during a time slice. At the end of a time slice, the results of the calculations are made available to the other subsystems by means of messages.

Preferably, a subsystem forms an independent Fault Containment Unit (FCU), [Kop12, p. 136-138]. A subsystem is an FCU if the immediate consequences of all internal error causes are isolated, and a defined malfunction of the output messages is specified on the interface. The isolation ensures that two FCUs fail largely independently of each other.

A decision subsystem (Fault-Tolerant Decision Subsystem—FTDSS) is provided, which is preferably positioned at the top of the hierarchy. The FTDSS includes simple software which is executed on fault-tolerant hardware. Fault-tolerant hardware as described in [Kop12, p. 155-157] masks an error occurring in the hardware.

In order to prevent an intrusion into the FTDSS via the Internet, the FTDSS preferably has no access to the Internet. As simple software is executed on fault-tolerant hardware in the FTDSS, and if no access to the Internet is available, it can be assumed that the FTDSS is a secure subsystem which works correctly and achieves a required reliability of fewer than $10^{-8}$ failures/hour. Proving such high reliability requires rigorous system development according to ASIL D with the support of formal methods and would be practically impossible to implement in a complex software system.

Furthermore, three subsystems are provided, which are preferably positioned at the next level of the hierarchy:

A subsystem controlling the technical system, e.g., a vehicle, during normal operation—the Normal Processing Subsystem NPSS. Normal operation is present if all assumptions made in the system design of the NPSS regarding the function of the real-time computer system and its environment are fulfilled, i.e., the mechanics of the technical apparatus and the environment in which the technical apparatus is located. A violation of any of these assumptions is what we call a critical event. A critical event that is not controlled by the NPSS results in abnormal operation.

A subsystem which takes control of the process (e.g., the vehicle) during abnormal operation, i.e., after the occurrence of an event not controlled by the NPSS, and which puts the process (the vehicle) into a safe state—the so-called Critical Event Handling Subsystem CEHSS; and a Monitor Subsystem, i.e., a subsystem that monitors the functioning of the NPSS and CEHSS.

Each of these three subsystems is isolated and autonomous and evaluates the sensor data with diversified software. As each of these three subsystems, or the software executed on these subsystems, comprises well over 10,000 commands, these three subsystems are complex. It is assumed that a complex software system is developed and validated according to ASIL B and that the mean time (MTTF) to the occurrence of an error during operation is $10^{-4}$ Hours.

The architecture described here can control the worst case, namely that a Byzantine error occurs in one of the complex subsystems at a random time. Such a Byzantine error—whether the cause of the failure is a hardware failure, a software failure, or an intrusion—is recognized and controlled by the proposed architecture, especially as the complex subsystems form fault-containment units.

Advantageous embodiments of the method according to the invention and the real-time computer system according to the invention are specified in the dependent claims. In particular, the following features can be realized in the method according to the invention and/or in the real-time computer system according to the invention, each on its own or in any combination:

The NPSS and/or the MSS and/or the CEHSS, preferably all three of these data processing subsystems, each have a Watchdog, wherein the Watchdog is set up to trigger the restart of the respective data processing subsystem. A watchdog is described in U.S. Pat. No. 5,513,319, for example.

The Fault-Tolerant Decision Subsystem, FTDSS, is set up to send the received set of setpoints for abnormal operation to the Monitor Subsystem, MSS, in a message during each time slice, preferably at the end of the time slice, and the Monitor Subsystem, MSS, during each time slice reviews whether the set of setpoints for abnormal operation which it receives from the Critical Event Handling Subsystem, CEHSS, via the FTDSS, in particular by means of messages, is compatible with the environmental model computed by the MSS on the basis of the MSS sensor data and ensures safe control of the technical apparatus in abnormal operation, and, if this is the case, sets another correctness indicator, the correctness indicator-2, to the value TRUE, and if this is not the case, or if no set of setpoints for abnormal operation was received from the CEHSS, sets the correctness indicator-2 to the value FALSE, and wherein the Monitor Subsystem, MSS, sends the correctness indicator-2 to the Normal Processing Subsystem, NPSS, after a delay interval longer than the restart time of the CEHSS, and wherein the Normal Processing Subsystem, NPSS, reviews whether the correctness indicator-2 received from the Monitor Subsystem, MSS, is set to FALSE and, if this is the case, interrupts the normal control of the technical apparatus and puts the technical apparatus into a safe state.

The Normal Processing Subsystem, NPSS, during each time slice also transmits a planned trajectory for normal operation, in addition to the set of setpoints for normal operation, for example in the message in which it sends the set of setpoints for normal operation to the Monitor Subsystem, MSS.

The time server is fault-tolerant.

The data-processing subsystems are insecure subsystems, i.e., they contain complex software executed on non-fault-tolerant hardware.

The data processing subsystems contain diversified software, for example for calculating or reviewing the setpoints for the actuators and/or for computing an environmental model or models.

Each of the data processing subsystems has its own set of sensors.

Each of the subsystems has its own power supply.

BRIEF DESCRIPTION OF THE DRAWINGS

In the following, the invention is explained in more detail by way of examples on the basis of drawings. In the drawings.

DETAILED DESCRIPTION

The following first provides an

Explanation of Terms Used

In the following, important terms used in this document are explained:

| | |
|---|---|
| Abnormal operation | The operation of a →Cyber-physical System (CPS) (e.g., of a motor vehicle) under conditions that deviate from the specification of the CPS and its environment. |
| ASIL | Automotive Safety Integrity Levels - Safety levels described in the ISO standard ISO 26262 |
| Byzantine error | In information technology, Byzantine errors are those errors in which a system behaves incorrectly in an arbitrary manner [WikIb] |
| Critical Event Handling Subsystem (CEHSS) | A →subsystem which calculates the setpoints for the actuators during →abnormal operation. |
| Cyber-Physical System (CPS) | A system comprising a technical apparatus and a real-time computer system controlling the apparatus. |
| Diversified software | Two software systems are diversified if the given task is solved by independent development teams, with different development tools using different algorithms. Diverse software minimizes the likelihood that a software error will occur simultaneously in two redundant diverse software systems. |
| Simple software | Software which contains fewer than 10,000 commands and is designed according to ASIL D to find all design errors. |
| Fail Silent FCU | An →FCU which does not produce output messages in the event of an error. |
| Fault-Containment Unit (FCU) | A →subsystem which isolates the immediate consequences of all internal error causes and specifies a defined malfunction of the output messages on the interface. The isolation ensures that two FCUs fail largely independently of each other. →Fail Silent FCU |
| Fault-Tolerant Decision Subsystem (FTDSS) | A →subsystem which →contains simple software which is executed on fault-tolerant hardware and decides which setpoints are supplied to the actuators. |
| Complex software | Software which comprises more than 10,000 commands or was not developed according to ASIL D. Complex software may contain design errors. |
| Correctness indicator | A variable which can take the value TRUE or FALSE and which indicates whether a result to be reviewed is correct. |
| Critical event | An event that triggers the transition from →normal operation to →abnormal operation. |
| MTTF—Mean Time to Fail | Mean time to occurrence of a failure during the operation of a system. |
| Monitor Subsystem (MSS) | A →subsystem which reviews whether the output values of the →Normal-Processing Subsystem (NPSS) and the →Critical Event Handling Subsystem (CEHSS) ensure safe operation. |
| Normal-Processing Subsystem (NPSS) | A →subsystem which calculates the setpoints for the actuators during →normal operation. |
| Normal operation | The operation of a →Cyber-Physical System (CPS) (e.g., of a motor vehicle) under the conditions contained in the specification of the CPS and its environment. |
| Secure subsystem | A →subsystem in which →simple software is executed on fault-tolerant hardware |
| Subsystem | A partial system of a distributed real-time computer system of a →CPS. A subsystem is a largely self-contained unit of hardware and software which computes output data and a new internal state from the input data and the internal state of the subsystem. A subsystem |

| | |
|---|---|
| | communicates with other subsystems through the exchange of messages. |
| Trajectory | Track or motion path of an object |
| Insecure subsystem | A →subsystem in which →complex software is executed, or non-fault-tolerant hardware is used. |
| Restarting a subsystem | Restarting a subsystem comprises all actions of a subsystem between the time of the reset of the hardware of the subsystem and the time when→normal operation is resumed. |

Figure 1:
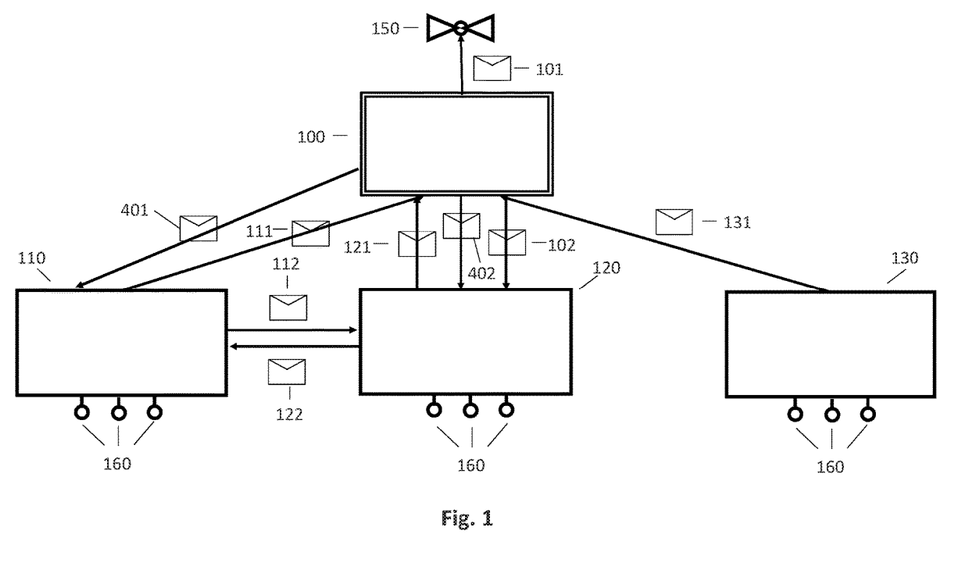
FIG. 1 is an overview of the architecture of the distributed real-time computer system.

FIG. 1 shows the structure of the distributed real-time computer system for controlling a technical apparatus, e.g., a technical system or a machine, such as a robot or a vehicle, in particular a motor vehicle.

As shown in FIG. 1, the real-time computer system comprises subsystems 100, 110, 120, 130, wherein each Subsystem has a Fault Containment Unit, and the Subsystems are preferably arranged in a hierarchy. In this example, the real-time computer system furthermore comprises a time server 210, which is positioned outside said hierarchy, if applicable.

In the real-time computer system, a global time is realized in a known manner, i.e., by means of the time server 210, by means of which the subsystems 100, 110, 120, 130 are synchronized in time. The timeline is divided into time slices, which are time periods of the same duration, which preferably follow each other directly, wherein these time slices are synchronized with each other for all subsystems via the global time, such that respective observed time slices begin and end at the same time in each subsystem.

One of the subsystems, the so-called Decision Subsystem, the Fault-Tolerant Decision Subsystem (FTDSS) 100, which is preferably positioned at the top of the hierarchy, can transfer setpoints to actuators 150 in each time slice by means of a message 101.

Furthermore, three of the subsystems are designed so-called Data Processing Subsystems, which are preferably positioned on the next lower hierarchy level relative to the FTDSS. Specifically, these data processing subsystems are: the Normal Processing Subsystem (NPSS) 110, the Monitor Subsystem (MSS) 120, and the Critical Event Handling Subsystem (CEHSS) 130. These three Data Processing Subsystems capture the sensor data of an environment by means of sensors 160 and evaluate these sensor data independently of each other, preferably using diversified software.

The Fault-Tolerant Decision Subsystem (FTDSS) 100 is a secure subsystem, i.e., it contains simple software that is executed on fault-tolerant hardware. It is assumed that a secure subsystem meets the given reliability requirements, depending on the specific application, as described above.

The Data Processing Subsystems 110, 120, 130 can be insecure subsystems, i.e., they can contain complex software executed on non-fault-tolerant hardware. It is assumed that a complex software system is developed and validated according to ASIL B and that the mean time (MTTF) to the occurrence of an error during operation is $10^{-4}$ Hours. It cannot be ruled out that a Byzantine error may occur in an insecure subsystem.

The Normal Processing Subsystem (NPSS) 110 observes the environment at the beginning of each time slice with sensors 160, preferably its own, builds an environmental model and computes a set of setpoints for the actuators 150 in normal operation. The setpoints computed by the subsystem 110 are sent to the Fault-Tolerant Decision Subsystem (FTDSS) 100 in a message 111 and to the Monitor Subsystem (MSS) 120 in a message 112. In the event that the subsystem 110 detects that the assumptions about normal operation have been violated, it cancels an ongoing process and puts the technical apparatus into a safe state. In addition, an operator, e.g., the driver of a motor vehicle, can be informed about this and, if necessary, control can be handed over to said operator.

The Critical Event Handling Subsystem (CEHSS) 130 observes the environment at the beginning of each time slice with sensors 160, preferably its own, uses diversified software to build an environmental model and computes a set of setpoints for the actuators 150 in abnormal operation. It sends these setpoints to the Fault-Tolerant Decision Subsystem (FTDSS) 100 in a message 131.

The Fault-Tolerant Decision Subsystem (FTDSS) 100 receives the messages 111, 131 with the setpoints for normal and abnormal operation in every time slice and sends these setpoints to the Monitor Subsystem (MSS) 120 in a message 102.

The Monitor Subsystem (MSS) 120 during each time slice reviews whether the set of setpoints for normal operation, which it received directly from the Normal Processing Subsystem (NPSS) 110 in the message 112, is compatible with an environmental model computed by the MSS 120 using diversified software and based on sensor data determined by means of sensors 160, and whether it ensures safe control of the technical apparatus under normal conditions.

An environmental model is, for example, a digital data structure that at a given time represents the characteristics of the environment of a technical apparatus that are essential for the given task. An example of an environmental model is the description of a road and the objects located on the road at the selected time.

The Monitor Subsystem (MSS) 120 also reviews whether the set of setpoints it receives from the Normal Processing Subsystem (NPSS) 110 in the message 112 is identical to the corresponding set of setpoints which was sent to the Monitor Subsystem (MSS) 120 by the Normal Processing Subsystem (NPSS) 110 via the Fault-Tolerant Decision Subsystem (FTDSS) 100 in the message 102.

This second review is necessary because the following malicious Byzantine error of the Normal Processing Subsystem (NPSS) 110 must be detected: A faulty Normal Processing Subsystem (NPSS) 110 sends correct setpoints to the Monitor Subsystem (MSS) 120 and incorrect setpoints to the Fault-Tolerant Decision Subsystem (FTDSS) 100.

If both reviews performed by the Monitor Subsystem (MSS) 120 are positive, the correctness indicator-1 is set to the value TRUE. If one of the two reviews is negative, the correctness indicator-1 is set to the value FALSE. Following the review, the Monitor Subsystem (MSS) 120 sends the correctness indicator-1 to the Fault-Tolerant Decision Subsystem (FTDSS) 100 in a message 121.

The Fault-Tolerant Decision Subsystem (FTDSS) 100 decides as follows during each time slice: If the correctness indicator-1 contains a value of TRUE, the set of setpoints for normal operation is sent to the actuators 150 in the message 101; if the correctness indicator-1 contains a value of FALSE or if the expected message 121 with the correctness indicator-1 is missing, the set of setpoints for abnormal operation is forwarded to the actuators 150 in the message 101, and from this point on, only setpoints for abnormal operation are sent to the actuators 150 during subsequent time slices until the technical apparatus has achieved a safe state. The absence of the expected message 121 with the correctness indicator-1 is an indicator of the fail-silent failure of the Monitor Subsystem (MSS) 120.

The Fault-Tolerant Decision Subsystem (FTDSS) 100 contains a simple software, in particular a very simple software, which can be realized without the support of operating systems. This is an advantage because experience has shown that operating systems are complex and not free of design errors [Cho01].

The Monitor Subsystem (MSS) 120 must also review during each time slice whether the set of setpoints for abnormal operation, which it receives from the Critical Event Handling Subsystem (CEHSS) 130 via the messages 131, 102, is compatible with the environmental model computed by the MSS based on the sensor data from the sensors 160 of the MSS and ensures safe control of the process in abnormal operation. If this is the case, the Monitor Subsystem (MSS) 120 sets another correctness indicator, the correctness indicator-2, to the value TRUE, and if it is not the case, or if the MSS 120 has received no message from the CEHSS 130 during a time slice, the correctness counter-2 is set to the value FALSE.

The transmission of the setpoints for abnormal operation in the messages 131, 102 via the detour using the FTDSS 100 is necessary to exclude a Byzantine error of the Critical Event Handling Subsystem (CEHSS) 130.

The Monitor Subsystem (MSS) 120 sends the value of the correctness indicator-2 or the correctness indicator-2 to the Normal Processing Subsystem (NPSS) 110 in a message 122, such that it can be communicated to the Normal Processing Subsystem (NPSS) 110 whether an error occurred in the Critical Event Handling Subsystem (CEHSS) 130 or this subsystem failed due to a fail-silent error. The Normal Processing Subsystem (NPSS) 110 reviews during each time slice whether the correctness indicator-2 received from the Monitor Subsystem (MSS) 120 assumes the value FALSE and, if this is the case, the Normal Processing Subsystem (NPSS) 110 puts the technical apparatus into a safe state.

It is advantageous if each of the Data Processing Subsystems 110, 120, 130 performs an analysis of the sensor data, the fusion of the sensor data from the sensors 160 and/or the definition of trajectories by means of diverse software. This reduces the likelihood that the same software error will occur in multiple subsystems.

A trajectory, for example, is a path that the technical apparatus can execute over time to perform the predefined task. The characteristics of the trajectories of an apparatus depend on the design of the apparatus, the predefined task and the current environmental conditions. For example, a possible path that a vehicle can execute under the given environmental conditions to reach its destination is called a trajectory.

A trajectory can also be described as the temporal sequence of setpoints.

It is advantageous if each of the Data Processing Subsystems 110, 120, 130 has its own set of sensors 160. This prevents an error in one sensor from causing a correlated failure of multiple subsystems.

The Normal Processing Subsystem (NPSS) 110 can send the planned trajectory for normal operation, in addition to the set of setpoints, to the Monitor Subsystem (MSS) 120 in the message 112 during each time slice, to give the Monitor Subsystem (MSS) 120 the opportunity to review the planned trajectories.

Furthermore, the Fault-Tolerant Decision Subsystem, FTDSS, 100 sends the setpoints forwarded to the actuators 150 to the NPSS 110 and to the MSS 120 in messages 401, 402 during each time slice. In the event that the NPSS 110 and/or MSS 120, based on the review of the setpoints contained in the messages 401, 402, determine that the FTDSS 100 has forwarded the setpoints for abnormal operation to the actuators 150, a restart of the MSS 120 and NPSS 110 is triggered.

The CEHSS 130 communicates to the FTDSS 100 in the message 131 whether the technical apparatus is in a safe state.

Restarting the two data processing subsystems, namely the NPSS 110 and the MSS 120, in each case comprises the following steps:
a) resetting the hardware of the data processing subsystem,
b) executing a test software for determining the integrity of the data processing subsystem,
c) reinitializing and restarting the software of the data processing subsystem,
d) performing calculations with the sensor data obtained from observations of the environment made at the beginning of a time slice.

The restarting is completed as soon as
the FTDSS 100, based on the content of the message 131 from the CEHSS 130, in which the CEHSS 130 communicates whether the technical apparatus is in a safe state, determines that the system is in a safe state, and
the FTDSS 100 receives a set of setpoints for normal operation from the NPSS 110 during a time slice, for example, in a message 111, and
the FTDSS 100 receives the correctness indicator-1 with a value of TRUE from the MSS 120, for example with a message 121, during said time slice.

After the restart is complete, the FTDSS 100 again transfers the setpoints for normal operation received from the NPSS 110 to the actuators.

Preferably, both the NPSS 110 and the MSS 120 are set up to trigger their restart themselves. The NPSS 110 and the MSS 120 each have a Watchdog for this purpose, for example, which can trigger the restart of the Data Processing Subsystem 110, 120 in question. Preferably, the CEHSS 130 also has a Watchdog which can trigger the restart of the CEHSS 130.

Figure 2:
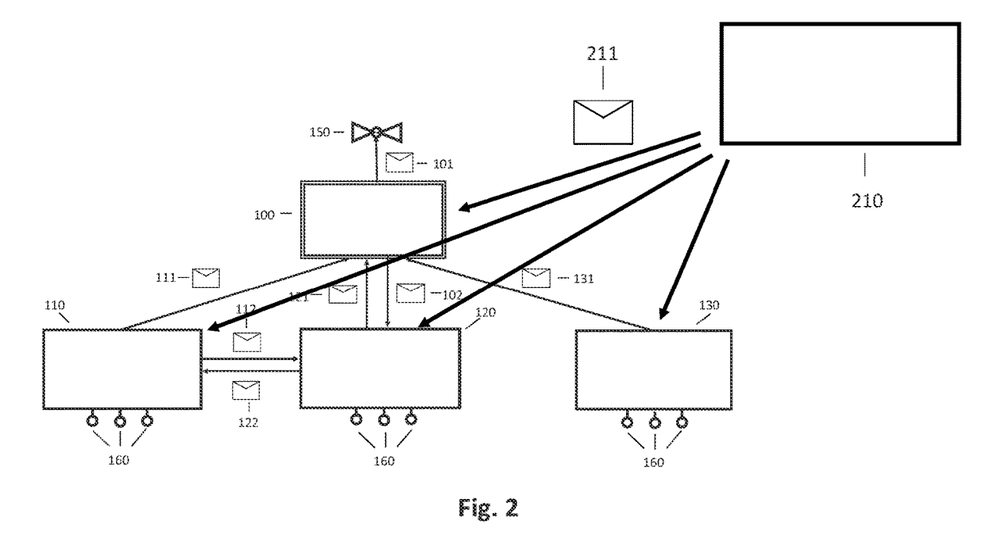
FIG. 2 shows a realization of a clock synchronization by means of a fault-tolerant time server.

FIG. 2 shows a time server 210, as an example of how it can be provided in a real-time computer system from FIG. 1, which periodically sends synchronization messages 211 to the subsystems 100, 110, 120, 130 to synchronize the clocks of the subsystems. It is advantageous if the time server 210 is executed in a fault-tolerant way.

Figure 3:
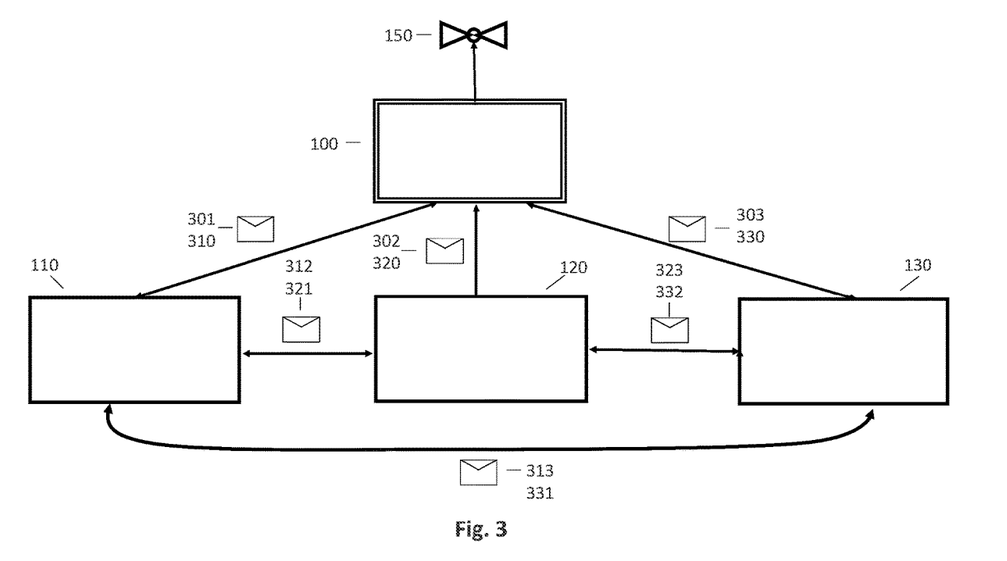
FIG. 3 shows a realization of the clock synchronization by means of the subsystems of the real-time computer system.

As the four subsystems 100, 110, 120, 130 are autonomous FCUs with independent oscillators/clocks, it is also possible to realize a fault-tolerant clock synchronization to establish a global time by means of these four subsystems. FIG. 3 shows the message exchange required to conduct a fault-tolerant clock synchronization, as described in [Kop12, pages 69-74], by means of the four subsystems 100, 110, 120, 130. To do this, the following synchronization messages must be exchanged during each synchronization period:

Synchronization message 301 from the subsystem 100 to the subsystem 110

Synchronization message 310 from the subsystem 110 to the subsystem 100

Synchronization message 302 from the subsystem 100 to the subsystem 120

Synchronization message 320 from the subsystem 120 to the subsystem 100

Synchronization message 303 from the subsystem 100 to the subsystem 130

Synchronization message 330 from the subsystem 130 to the subsystem 100

Synchronization message 312 from the subsystem 110 to the subsystem 120

Synchronization message 321 from the subsystem 120 to the subsystem 110

Synchronization message 323 from the subsystem 120 to the subsystem 130

Synchronization message 332 from the subsystem 130 to the subsystem 120

Synchronization message 313 from the subsystem 110 to the subsystem 130

Synchronization message 331 from the subsystem 130 to the subsystem 110

In general, in order to prevent a failure of a central power supply from causing a failure of all subsystems 100, 110, 120, 130, 210, it is advantageous if each of the subsystems 100, 110, 120, 130, 210 has an independent power supply (e.g., via its own battery).

The following overview concludes by showing how to detect and treat an error or intrusion that occurs in a subsystem.

Error Analysis

| Faulty subsystem or intrusion in | Error detection | Error handling |
| --- | --- | --- |
| Normal-Processing Subsystem | Monitor Subsystem detects errors and reports the error to the Fault-Tolerant Decision System | Fault-Tolerant Decision System switches the apparatus to a safe state |
| Critical Event Handling Subsystem | Monitor Subsystem detects errors and reports the error to the Normal-Processing Subsystem | Normal-Processing Subsystem switches the apparatus to a safe state |
| Monitor Subsystem | Fault-Tolerant Decision Subsystem detects the error | Fault-Tolerant Decision System switches the apparatus to a safe state |
| Fault-Tolerant Decision Subsystem | No error detection provided, as simple software on fault-tolerant hardware is free of errors | No error handling provided |

LITERATURE CITED

[Avi85] Avizienis, A. *The N-Version Approach to Fault-Tolerant Systems*. IEEE Trans. on Software Engineering. Vol. 11, No 12, pp. 1491-1501. 1985.

[Cho01] Chou, A. et al. *An Empirical Study of Operating System Errors*. Proc. of the ACM SOPS 2001 pp. 73-88. 2001

ISO Standard ISO 26262 on functional safety.

[Dvo09] Dvorak, D. L. Editor. NASA Study on Flight Software Complexity. Final Report. Jet Propulsion Laboratory, Pasadena, Calif. USA. 2009.

[Kop11] Kopetz, H. Real-Time Systems—Design Principles for Distributed Embedded Applications. Springer Verlag. 2011

[Wiklb] Wikipedia, Definition von einem byzantinischen Fehler URL: https://de.wikipedia.org/wiki/Byzantinischer_Fehler

[Con02] Constantinescu, C. Impact of deep submicron technology on dependability of VLSI circuits. Proceedings International Conference on Dependable Systems and Networks, Washington, D.C., USA, pp. 205-209, 2002

The invention claimed is:

1. A method for controlling a technical apparatus with a distributed real-time computer system, wherein the real-time computer system comprises:

subsystems, wherein the subsystems are arranged hierarchically, wherein the subsystems are synchronized via a global time by using a time server (210), which is positioned outside the hierarchy of the subsystems, wherein the time server (210) periodically sends synchronization messages (211) to the clocks of each subsystem for synchronizing the subsystems or the clocks of the subsystems to establish the global time, wherein using this global time, the timeline is divided into a sequence of synchronized time slices, wherein each subsystem (100, 110, 120, 130) and, if present, the time server (210), forms its own Fault-Containment Unit, wherein one of the subsystems is a decision subsystem, the so-called Fault-Tolerant Decision Subsystem, FTDSS, (100), which is positioned at the highest level of the hierarchy, wherein the FTDSS (100) can transfer setpoints to actuators (150) in each time slice by means of messages (101), wherein the Fault-Tolerant Decision Subsystem, FTDSS, (100) is a secure subsystem comprising simple software executed on fault-tolerant hardware, wherein at least or exactly three Data Processing Subsystems, a Normal Processing Subsystem, NPSS, (110), a Monitor Subsystem, MSS, (120), and a Critical Event Handling Subsystem, CEHSS, (130), are provided, all of which are positioned at the next lower hierarchical level, wherein these at least or exactly three data processing subsystems by means of sensors (160) capture sensor data from an environment observed by the sensors (160) and evaluate these sensor data independently of each other, wherein the environment is observed by the data processing subsystems (110, 120, 130) at the beginning of each time slice and calculations are carried out during this time slice with the sensor data obtained from the observations of the environment carried out at the beginning of said time slice, and wherein:

i. the Normal Processing Subsystem, NPSS, (110) sends a set of setpoints for a normal operation to the Fault-Tolerant Decision Subsystem, FTDSS, (100) in a message (111) and to the Monitor Subsystem, MSS, (120) in a message (112) during each time slice at the end of the time slice, ii. the Critical Event Handling Subsystem, CEHSS, (130) sends a set of setpoints for an abnormal operation to the Fault-Tolerant Decision Subsystem, FTDSS, (100) in a message (131) during each time slice at the end of said time slice, and wherein the CEHSS (130) also communicates to the FTDSS (100) in said message (131) whether the technical apparatus is in a safe state, iii. the Fault-Tolerant Decision Subsystem, FTDSS, (100) sends the received set of setpoints for normal operation to the Monitor Subsystem, MSS, (120) in a message (102) during each time slice at the end of said time slice, and wherein the Fault-Tolerant Decision Subsystem, FTDSS, (100) furthermore sends the received set of setpoints for abnormal operation to the Monitor Subsystem, MSS, (120) in a message (102) during each time slice at the end of said time slice, and iv. the Monitor Subsystem, MSS, (120) carries out a review during each time slice whether the set of setpoints for normal operation, which it received from the Normal Processing Subsystem, NPSS, (110) in the message (112), is compatible with an environmental model calculated by the MSS (120) on the basis of the sensor data (160) from the MSS (120) and ensures safe control of the technical apparatus under normal conditions, and furthermore the Monitor Subsystem, MSS, (120) carries out a review during each time slice whether the set of setpoints for normal operation, which it received from the Normal Processing Subsystem, NPSS, (110) in said message (112), is identical to the corresponding set of setpoints sent by the Normal Processing Subsystem, NPSS, (110) via the Fault-Tolerant Decision Subsystem, FTDSS, (100) to the Monitor Subsystem, MSS, (120), and wherein if both reviews are positive, sets a correctness indicator, correctness indicator-1, to the value TRUE and, if one of the two checks is negative or both checks are negative, sets the correctness indicator-1 to the value FALSE and sends the correctness indicator-1, or the value of the correctness indicator-1, to the Fault-Tolerant Decision Subsystem, FTDSS, (100) in a message (121) during each time slice, and wherein the Fault-Tolerant Decision Subsystem, FTDSS, (100) makes a decision as follows during each time slice: in the event that the correctness indicator-1 is TRUE, the set of setpoints for normal operation is transferred to the actuators (150) in messages (101); in the event that the correctness indicator-1 has a value of FALSE or if a message (121) with the correctness indicator-1 expected by the FTDSS (100) is missing, the set of setpoints for abnormal operation is forwarded to the actuators (150) in messages (101), wherein, in this case, the setpoints for abnormal operation are forwarded to the actuators (150) during the time slices following that point in time, until the technical apparatus has reached a safe state, which is communicated to the FTDSS (100) by the CEHSS in the message (131), wherein the Fault-Tolerant Decision Subsystem, FTDSS, (100) sends the setpoints forwarded to the actuators (150) to the NPSS (110) and to the MSS (120) in messages (401, 402) during each time slice, wherein in the event that the NPSS (110) and/or the MSS (120), on the basis of reviewing the setpoints contained in the messages (401, 402), determine that the FTDSS (100) has forwarded the setpoints for abnormal operation to the actuators (150), a restart of the MSS (120) and the NPSS (110) is triggered, wherein both the NPSS (110) and the MSS (120) are set up to trigger their own restart, wherein the restart is completed as soon as:
  the FTDSS (100), based on the content of the message (131) from the CEHSS (130), in which the CEHSS (130) communicates whether the technical apparatus is in a safe state, determines that the system is in a safe state, and
  the FTDSS (100), receives a set of setpoints for normal operation from the NPSS (110) during a time slice in a message (111), and
  the FTDSS (100) receives the correctness indicator-1 with a value of TRUE from the MSS (120) with a message (121), during said time slice, wherein, after completion of the restart, the FTDSS (100) again transfers the setpoints for normal operation received from the NPSS (110) to the actuators, such that steps i.-iv. can be carried out again or are carried out, and wherein restarting the two data processing subsystems, namely the NPSS (110) and the MSS (120), each comprises the following steps:
  a) resetting the hardware of the data processing subsystem,
  b) executing a test software for determining the integrity of the data processing subsystem,
  c) reinitializing and restarting the software of the data processing subsystem,
  d) performing calculations with the sensor data obtained from observations of the environment made at the beginning of a time slice.

2. The method according to claim 1, wherein a restart of the NPSS (110) is triggered by a Watchdog of the NPSS (100), and/or a restart of the MSS (120) is triggered by a Watchdog of the MSS (120), and/or a restart of the CEHSS (130) can be triggered by a Watchdog of the CEHSS (130).

3. The method according to claim 1, wherein the Fault-Tolerant Decision Subsystem, FTDSS, (100) furthermore sends the received set of setpoints for abnormal operation to the Monitor Subsystem, MSS, (120) in a message (102) during each time slice, at the end of the time slice, and wherein the Monitor Subsystem, MSS, (120) during each time slice reviews whether the set of setpoints for abnormal operation, which it receives from the Critical Event Handling Subsystem, CEHSS, (130) via the FTDSS (100) by means of messages (131, 102), is compatible with the environmental model computed by the MSS on the basis of the MSS sensor data and ensures safe control of the technical apparatus in abnormal operation, and, if this is the case, sets another correctness indicator, the correctness indicator-2, to the value TRUE, and if this is not the case, or if no set of setpoints for abnormal operation was received from the CEHSS (130), sets the correctness indicator-2 to the value FALSE, and wherein the Monitor Subsystem, MSS, (120)

sends the correctness indicator-2 to the Normal Processing Subsystem, NPSS, (110) after a delay interval longer than the restart time of the CEHSS (130), and wherein the Normal Processing Subsystem, NPSS, (110) reviews whether the correctness indicator-2 received from the Monitor Subsystem, MSS, is set to FALSE and, if this is the case, interrupts the normal control of the technical apparatus and puts the technical apparatus into a safe state.

4. The method according to claim 1, wherein the Normal Processing Subsystem, NPSS, (110) during each time slice also transmits a planned trajectory for normal operation, in addition to the set of setpoints for normal operation, in the message (112) in which it sends the set of setpoints for normal operation to the Monitor Subsystem, MSS, (120).

5. The method according to claim 1, wherein the time server is fault-tolerant.

6. The method according to claim 1, wherein the Data Processing Subsystems (110, 120, 130) are insecure subsystems comprising complex software executed on non-fault-tolerant hardware.

7. The method according to claim 1, wherein the Data Processing Subsystems (110, 120, 130) contain a diversified software to compute the setpoints for the actuators (150) and/or an environmental model.

8. The method according to claim 1, wherein each of the Data Processing Subsystems (110, 120, 130) has its own set of sensors or each Data Processing Subsystem (110, 120, 130) has access to each of the sensors.

9. The method according to claim 1, wherein each of the subsystems (100, 110, 120, 130, 210) has its own energy supply.

10. A real-time computer system for controlling a technical apparatus, wherein the real-time computer system comprises:
   subsystems, wherein the subsystems are arranged hierarchically,
   wherein the subsystems are synchronized via a global time by using a time server (210), which is preferably positioned outside the hierarchy of the subsystems, wherein the time server (210) is set up to periodically send synchronization messages (211) to each subsystem, including to the clocks of each subsystem, for synchronizing the subsystems or the clocks of the subsystems for establishing the global time,
   wherein using this global time, the timeline is divided into a sequence of synchronized time slices,
   wherein each subsystem (100, 110, 120, 130) and, if present, the time server (210), forms its own Fault-Containment Unit,
   wherein one of the subsystems is a decision subsystem, the so-called Fault-Tolerant Decision Subsystem, FTDSS, (100), which is positioned at the highest level of the hierarchy, wherein the FTDSS (100) is set up to transfer setpoints to actuators (150) during each time slice by means of messages (101), wherein the Fault-Tolerant Decision Subsystem, FTDSS, (100) is a secure subsystem comprising simple software executed on fault-tolerant hardware,
   wherein at least or exactly three Data Processing Subsystems, a Normal Processing Subsystem, NPSS, (110), a Monitor Subsystem, MSS, (120), and a Critical Event Handling Subsystem, CEHSS, (130), are provided, all of which are positioned at the next lower hierarchical level, wherein these at least or exactly three Data Processing Subsystems are set up to capture sensor data by means of sensors (160) from an environment observed by the sensors (160) and to evaluate these sensor data independently of each other,
   wherein the environment is observed by the Data Processing Subsystems (110, 120, 130) at the beginning of each time slice and calculations are carried out during this time slice with the sensor data obtained from the observations of the environment carried out at the beginning of said time slice, and wherein:
   i. the Normal Processing Subsystem, NPSS, (110) is set up to send a set of setpoints for normal operation to the Fault-Tolerant Decision Subsystem, FTDSS, (100) in a message (111) and to the Monitor Subsystem, MSS, (120) in a message (112) during each time slice, at the end of the time slice,
   ii. the Critical Event Handling Subsystem, CEHSS, (130) is set up to send a set of setpoints for an abnormal operation to the Fault-Tolerant Decision Subsystem, FTDSS, (100) in a message (131) during each time slice, at the end of said time slice, and wherein the CEHSS (130) is set up to communicate to the FTDSS (100), in said message (131), whether the technical apparatus is in a safe state,
   iii. the Fault-Tolerant Decision Subsystem, FTDSS, (100) is set up to send the received set of setpoints for normal operation to the Monitor Subsystem, MSS, (120) in a message (102) during each time slice, and wherein the Fault-Tolerant Decision Subsystem, FTDSS, (100) is set up to furthermore send the received set of setpoints for abnormal operation to the Monitor Subsystem, MSS, (120) in a message (102) during each time slice, at the end of said time slice, and
   iv. the Monitor Subsystem, MSS, (120) is set up to carry out a review during each time slice whether the set of setpoints for normal operation, which it received from the Normal Processing Subsystem, NPSS, (110) in the message (112), is compatible with an environmental model calculated by the MSS (120) on the basis of the sensor data (160) from the MSS (120) and ensures safe control of the technical apparatus under normal conditions, and furthermore the Monitor Subsystem, MSS, (120) is set up to carry out a review during each time slice whether the set of setpoints for normal operation, which it received from the Normal Processing Subsystem, NPSS, (110) in said message (112), is identical to the corresponding set of setpoints sent by the Normal Processing Subsystem, NPSS, (110) to the Monitor Subsystem, MSS, (120) via the Fault-Tolerant Decision Subsystem, FTDSS, (100), and
   wherein if both reviews are positive, to set a correctness indicator, correctness indicator-1, to the value TRUE and, if one of the two checks is negative or both checks are negative, to set the correctness indicator-1 to the value FALSE and to send the correctness indicator-1 or the value of the correctness indicator-1 to the Fault-Tolerant Decision Subsystem, FTDSS, (100) in a message (121) during each time slice, and
   wherein the Fault-Tolerant Decision Subsystem, FTDSS, (100) makes a decision as follows during each time slice: in the event that the correctness indicator-1 is TRUE, the set of setpoints for normal operation is transferred to the actuators (150), for example in messages (101); in the event that the correctness indicator-1 has a value of FALSE or if a message (121) with the correctness indicator-1 expected by the FTDSS (100) is missing, the set of setpoints for abnormal operation is forwarded to the actuators (150), for example in messages (101), wherein, in this case, the setpoints for abnormal operation are forwarded to the actuators (150) during the time slices following that point in time until the technical apparatus reaches a safe state, which is communicated to the FTDSS (100) by the CEHSS, preferably in the message (131), wherein the Fault-Tolerant Decision Subsystem, FTDSS, (100) is set up send the setpoints forwarded to the actuators (150) to the NPSS (110) and to the MSS (120) in messages (401, 402) during each time slice, wherein in the event that the NPSS (110) and/or MSS (120), based on the review of the setpoints contained in the messages (401, 402), determine that the FTDSS (100) has forwarded the setpoints for abnormal operation to the actuators (150), a restart of the MSS (120) and NPSS (110) is triggered, wherein the restart is completed as soon as
the FTDSS (100), based on the content of the message (131) from the CEHSS (130), in which the CEHSS (130) communicates whether the technical apparatus is in a safe state, determines that the system is in a safe state, and the FTDSS (100), receives a set of setpoints for normal operation from the NPSS (110) during a time slice, for example, in a message (111), and the FTDSS (100) receives the correctness indicator-1 with a value of TRUE from the MSS (120), for example with a message (121), during said time slice, wherein, after completion of the restart, the FTDSS (100) again transfers the setpoints for normal operation received from the NPSS (110) to the actuators, such that steps i.-iv. can be carried out again or are carried out, and wherein restarting the two data processing subsystems, namely the NPSS (110) and the MSS (120), each comprises the following steps:
a) resetting the hardware of the data processing subsystem,
b) executing a test software for determining the integrity of the data processing subsystem,
c) reinitializing and restarting the software of the data processing subsystem,
d) performing calculations with the sensor data obtained from observations of the environment made at the beginning of a time slice.

11. The real-time computer system according to claim 10, wherein the NPSS (110) and/or the MSS (120) and/or the CEHSS (130) each has a Watchdog, whereby the Watchdog is set up to trigger the restarting of the respective Data Processing Subsystem (110, 120, 130).

12. The real-time computer system according to claim 10, wherein the Fault-Tolerant Decision Subsystem, FTDSS, (100) is set up to furthermore send the received set of setpoints for abnormal operation to the Monitor Subsystem, MSS, (120) in a message (102) during each time slice, at the end of the time slice, and wherein the Monitor Subsystem, MSS, (120) is set up to review during each time slice whether the set of setpoints for abnormal operation, which it receives from the Critical Event Handling Subsystem, CEHSS, (130) via the FTDSS (100), by means of messages (131, 102), is compatible with the environmental model computed by the MSS on the basis of the MSS sensor data and ensures safe control of the technical apparatus in abnormal operation, and, if this is the case, is set up to set another correctness indicator, the correctness indicator-2, to the value TRUE, and if this is not the case, or if no set of setpoints for abnormal operation was received from the CEHSS (130), to set the correctness indicator-2 to the value FALSE, and wherein the Monitor Subsystem, MSS, (120) is set up to send the correctness indicator-2 to the Normal Processing Subsystem, NPSS, (110) after a delay interval longer than the restart time of the CEHSS (130), and wherein the Normal Processing Subsystem, NPSS, (110) is set up to review whether the correctness indicator-2 received from the Monitor Subsystem, MSS, is set to the value FALSE and, if this is the case, to interrupt the normal control of the technical apparatus and to put the technical apparatus into a safe state.

13. The real-time computer system according to claim 10, wherein the Normal Processing Subsystem, NPSS, (110) during each time slice also transmits a planned trajectory for normal operation, in addition to the set of setpoints for normal operation, in the message (112) in which it sends the set of setpoints for normal operation to the Monitor Subsystem, MSS (120).

14. The real-time computer system according to claim 10, wherein the time server is fault-tolerant.

15. The real-time computer system according to claim 10, wherein the Data Processing Subsystems (110, 120, 130) are insecure subsystems comprising complex software executed on non-fault-tolerant hardware.

16. The real-time computer system according to claim 10, wherein the Data Processing Subsystems (110, 120, 130) contain a diversified software to compute the setpoints for the actuators (150) and/or an environmental model.

17. The real-time computer system according to claim 10, wherein each of the Data Processing Subsystems (110, 120, 130) has its own set of sensors.

18. The real-time computer system according to claim 10, wherein each of the subsystems (100, 110, 120, 130, 210) has its own energy supply.

* * * * *